United States Patent
Hwang et al.

(10) Patent No.: US 8,831,516 B2
(45) Date of Patent: Sep. 9, 2014

(54) APPARATUS AND METHOD FOR TRANSMITTING AND RECEIVING DATA DEPENDING ON CONNECTION PRIORITIES BETWEEN TERMINALS IN NEAR FIELD COMMUNICATION SYSTEM

(75) Inventors: Pil-Yong Hwang, Gimpo-si (KR); Jong-Hyung Kwun, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 194 days.

(21) Appl. No.: 13/594,027

(22) Filed: Aug. 24, 2012

(65) Prior Publication Data

US 2013/0052951 A1    Feb. 28, 2013

(30) Foreign Application Priority Data

Aug. 25, 2011   (KR) .................. 10-2011-0084994

(51) Int. Cl.
*H04B 5/00*     (2006.01)
*H04W 72/12*    (2009.01)
*H04W 84/10*    (2009.01)

(52) U.S. Cl.
CPC .............. *H04W 72/12* (2013.01); *H04W 84/10* (2013.01)
USPC ....................................................... 455/41.1

(58) Field of Classification Search
USPC ................. 455/41.1, 41.2, 452.2, 135, 67.13, 455/161.3, 277.2, 522, 127.1
See application file for complete search history.

(56) References Cited

U.S. PATENT DOCUMENTS

| | | | |
|---|---|---|---|
| 7,623,553 B2* | 11/2009 | Bhushan et al. | 370/527 |
| 8,311,002 B2* | 11/2012 | Nyberg et al. | 370/329 |
| 2005/0281219 A1 | 12/2005 | Kim et al. | |
| 2007/0177541 A1 | 8/2007 | Kwon et al. | |
| 2008/0070585 A1* | 3/2008 | Wu et al. | 455/452.2 |
| 2010/0118733 A1 | 5/2010 | Wu et al. | |

FOREIGN PATENT DOCUMENTS

| | | |
|---|---|---|
| KR | 10-2005-0119619 A | 12/2005 |
| KR | 10-2006-0111952 A | 10/2006 |
| KR | 10-2007-0001479 A | 1/2007 |
| KR | 10-1002843 B1 | 12/2010 |

* cited by examiner

*Primary Examiner* — Eugene Yun
(74) *Attorney, Agent, or Firm* — Jefferson IP Law, LLP

(57) ABSTRACT

A method for transmitting and receiving data according to a connection priority between terminals in a Near Field Communication (NFC) system is provided. The method includes determining a Proportional Fair (PF) value used to determine a connection priority of a first connection set up for direct communication between a first terminal and a second terminal, if there is data to transmit, requesting data transmission through the first connection by transmitting the determined PF value to the second terminal, and transmitting the data to the second terminal, if information for granting data transmission through the first connection is received from the second terminal.

24 Claims, 8 Drawing Sheets

APPARATUS AND METHOD FOR TRANSMITTING AND RECEIVING DATA DEPENDING ON CONNECTION PRIORITIES BETWEEN TERMINALS IN NEAR FIELD COMMUNICATION SYSTEM

PRIORITY

This application claims the benefit under 35 U.S.C. §119(a) of a Korean patent application filed in the Korean Intellectual Property Office on Aug. 25, 2011 and assigned Serial No. 10-2011-0084994, the entire disclosure of which is incorporated herein by reference.

BACKGROUND OF THE INVENTION

1. Field of the Invention

The present invention relates to communication systems. More particularly, the present invention relates to an apparatus and method for transmitting and receiving data depending on connection priorities between terminals in near field communication systems that perform direct communication between devices.

2. Description of the Related Art

Near Field Communication (NFC) is a technology for very-short distance wireless communication. NFC may include device-to-device communication or Ad-hoc communication that performs direct communication between devices without repeaters.

In an NFC network having a plurality of connections for terminals that can attempt direct communication between terminals, the plurality of connections may simultaneously attempt data transmission occasionally. In this case, if a connection uses the same frequency band as its adjacent connections, communication of the connection may collide with communications of the adjacent connections. Accordingly, there is a need for a scheme of determining a connection priority for each of a plurality of connections and allowing high-priority terminals to first perform communication depending on the connection priorities so that the collision may not occur.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address the above-mentioned problems and/or disadvantages and to provide at least the advantages described below. Accordingly, an aspect of the present invention is to provide an apparatus and method for transmitting and receiving data depending on a connection priority for each of a plurality of connections for terminals, which can attempt direct communication between terminals in a Near Field Communication (NFC) system.

Another aspect of the present invention is to provide an apparatus and method in which a transmitting terminal provides a Proportional Fair (PF) value to a receiving terminal, and the receiving terminal transmits and receives data depending on a connection priority associated with the PF value, in an NFC system.

Another aspect of the present invention is to provide an apparatus and method in which a receiving terminal provides ACK/NAK information determined depending on a connection priority and power information for a related connection, to a transmitting terminal for data transmission/reception in an NFC system.

In accordance with an aspect of the present invention, a method for transmitting and receiving data depending on a connection priority between terminals in an NFC system is provided. The method includes determining a PF value used to determine a connection priority of a first connection set up for direct communication between a first terminal and a second terminal, if there is data to transmit, requesting data transmission through the first connection by transmitting the determined PF value to the second terminal, and transmitting the data to the second terminal, if information for granting data transmission through the first connection is received from the second terminal.

In accordance with another aspect of the present invention, a method for transmitting and receiving data according to a connection priority between terminals in an NFC system is provided. The method includes receiving a first PF value for a first connection set up for direct communication between a first terminal and a second terminal, and a second PF value for at least one second connection existing between the first terminal and the second terminal, comparing the first PF value with the second PF value, transmitting information for granting communication for the first connection to the second terminal, if the first PF value corresponds to a highest value, and receiving data from the second terminal through the first connection.

In accordance with another aspect of the present invention, an apparatus for transmitting and receiving data according to a connection priority between terminals in an NFC system is provided. The apparatus includes a controller for determining a PF value used to determine a connection priority of a first connection set up for direct communication between a first terminal and a second terminal, if there is data to transmit, a receiver for receiving information for granting communication for the first connection from the second terminal, and a transmitter for requesting data transmission through the first connection by transmitting the determined PF value to the second terminal, and for transmitting the data to the second terminal when the receiver receives the information for granting communication for the first connection from the second terminal.

In accordance with another aspect of the present invention, an apparatus for transmitting and receiving data according to a connection priority between terminals in an NFC system is provided. The apparatus includes a receiver for receiving a first PF value for a first connection set up for direct communication between a first terminal and a second terminal and a second PF value for at least one second connection existing between the first terminal and the second terminal, and for receiving data from the second terminal through the first connection when information for granting communication for the first connection is transmitted to the second terminal, a controller for comparing the first PF value with the second PF value, and for selecting information for granting communication for the first connection if the first PF value corresponds to a highest value, and a transmitter for transmitting the information for granting communication for the first connection to the second terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will

Throughout the drawings, like reference numerals will be understood to refer to like parts, features, and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding, but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but are merely used by the inventor to enable a clear and consistent understanding of the invention. Accordingly, it should be apparent to those skilled in the art that the following description of exemplary embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In this specification, for convenience of description, during direct communication between terminals, a terminal serving as a receiving side is referred to as a 'receiving terminal' while a terminal serving as a transmitting side is referred to as a 'transmitting terminal'.

If the NFC network includes a plurality of connections for terminals that can attempt direct communication between terminals, and the plurality of connections simultaneously attempt data transmission, then communication of a connection may collide with communications of its adjacent connections when the arbitrary connection and its adjacent connections use the same frequency band. Accordingly, many studies have been conducted on schemes of allowing high-priority terminals to first perform communication depending on a priority for each of a plurality of connections so that the collision may not occur. FlashlinQ is one of these schemes. In flashlinQ, all terminals individually receive an external synchronization signal and randomly assign connection priorities to individual traffic slots based on their received synchronization signal.

Figure 1:
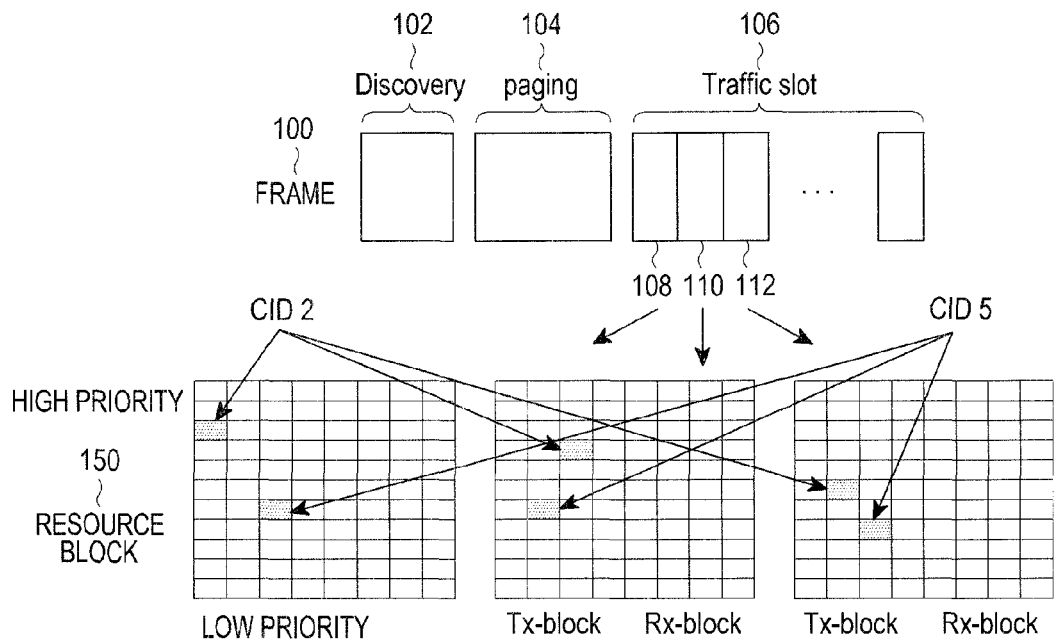
FIG. 1 shows structures of a frame and resource blocks configured based on flashlinQ according to an exemplary embodiment of the present invention.

FIG. 1 shows structures of a frame and resource blocks configured based on flashlinQ according to exemplary embodiments of the present invention.

Referring to FIG. 1, a frame 100 includes a discovery region 102 for acquisition of time synchronization, a paging region 104 for acquisition of logical channel Identifiers (IDs) for a plurality of connections, and a traffic slot region 106 for scheduling in the logical channels. The traffic slot region 106 includes first to third regions 108 to 112.

A resource block 150 represents a resource block of connection scheduling regions, which is included in each of the first region 108, the second region 110 and the third region 112. The vertical axis of the resource block represents tones, and the horizontal axis thereof represents Orthogonal Frequency Division Multiplexing (OFDM) symbols. The resource block includes sub blocks in which tones are mapped to OFDM symbols individually. In the order of arranged OFDM symbols, sub blocks to which high tones are mapped, are assigned a high-priority Connection Identifier (CID), while sub blocks to which low tones are mapped, are assigned a low-priority CID.

In flashlinQ, during direct communication between terminals, a transmitting terminal randomly determines priorities for connections using a hashing function. It is shown in FIG. 1 that as for resource blocks shown for the first region 108, the second region 110 and the third region 112, CID2 and CID5 are randomly assigned in related regions. Therefore, flashlinQ may ensure fairness of the connections and increase the entire spectral efficiency by uniformly distributing high-priority CIDs.

FlashlinQ may cause degradation in the entire system throughput, when the connections, communications of which are granted depending on the randomly determined priorities, have a bad channel state. In addition, when terminals having an arbitrary connection are located far away, their communication might not be possible because many adjacent connections located between the terminals may serve as interference to the arbitrary connection. Known problems of flashlinQ will be described below with reference to FIG. 2.

Figure 2:
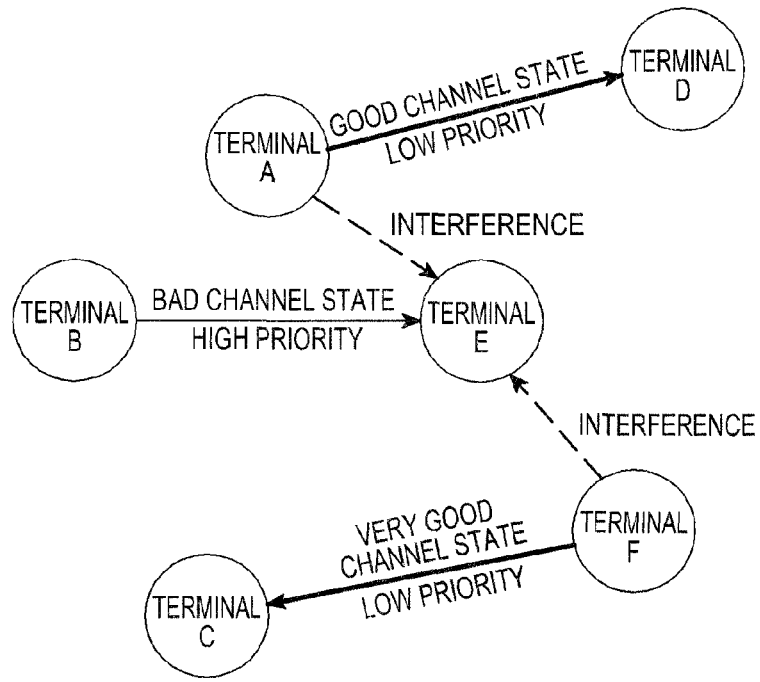
FIG. 2 shows an example of connections set up for direct communication between terminals in an NFC system according to an exemplary embodiment of the present invention.

FIG. 2 shows an example of connections set up for direct communication between terminals in an NFC system according to an exemplary embodiment of the present invention.

Referring to FIG. 2, an NFC system has a terminal A to a terminal F, and connections for direct communication between terminals are set up between the terminal A and the terminal D, between the terminal B and the terminal E, and between the terminal F and the terminal C. In FIG. 2, the connection set up between the terminal B and the terminal E has a high priority but has a bad channel state, the connection set up between the terminal A and the terminal D has a low priority but has a good channel state, and the connection set up between the terminal F and the terminal C has a low priority but has a very good channel state.

In flashlinQ, if the connections set up between the terminal A and the terminal D, between the terminal B and the terminal E, and between the terminal F and the terminal C simultaneously attempt data transmission, communication of the highest-priority connection between the terminal B and the terminal E among the connections is first granted. However, the entire system throughput may be reduced, because the connection set up between the terminal B and the terminal E basically has a bad channel state and the connections set up between the terminal A and the terminal D, and between the terminal F and the terminal C may serve as interference to the connection between the terminal B to the terminal E.

Although not illustrated, flashlinQ may cause a waste of resources because a plurality of CIDs, which corresponds to the number of Quality of Service (QoS) levels, are required for one QoS. Accordingly, exemplary embodiments of the present invention propose a scheme for enabling a priority of each connection to perform Proportional Fair (PF) scheduling depending on at least one parameter among a serviced data rate, the current channel state, a data QoS level, a data latency, and a data buffer size, when a plurality of connections simultaneously attempt data transmission in an NFC network, thereby contributing to an increase in the entire system throughput and to the improvement of fairness.

Figure 3:
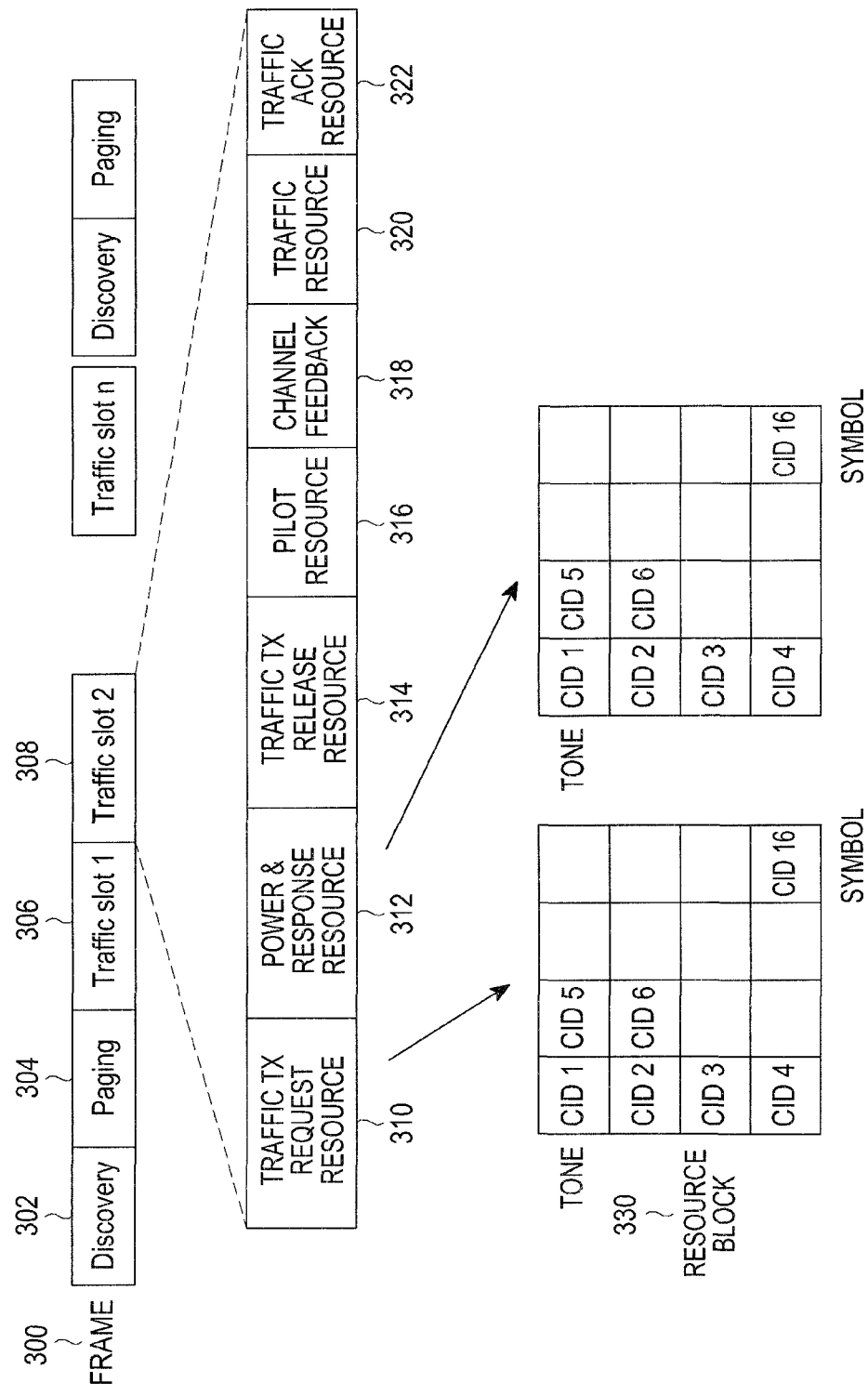
FIG. 3 shows structures of a frame and resource blocks according to an exemplary embodiment of the present invention.

FIG. 3 shows structures of a frame and resource blocks according to an exemplary embodiment of the present invention.

Referring to FIG. 3, a frame 300 includes a discovery region 302, a paging region 304, a first traffic slot region 306, and a second traffic slot region 308. The second traffic slot region 308 includes at least one of a traffic transmission request resource region 310, a power & response resource region 312, a traffic transmission release resource region 314, a pilot resource region 316, a channel feedback region 318, a traffic resource region 320, and a traffic Acknowledgment (ACK) resource region 322.

Resource blocks 330 represent resource blocks for the traffic transmission request resource region 310 and the power & response resource region 312. The resources that a transmitting terminal uses to request data transmission from a receiving terminal are assigned in the traffic transmission request resource region 310. The resources that the receiving terminal uses to send a response to the data transmission request to the transmitting terminal are assigned in the power & response resource region 312.

As for each of the resource blocks for the traffic transmission request resource region 310 and the power & response resource region 312, CID1 to CID6 and CID16 are assigned to sub blocks in fixed locations, and the CIDs has no priority.

Figure 4:
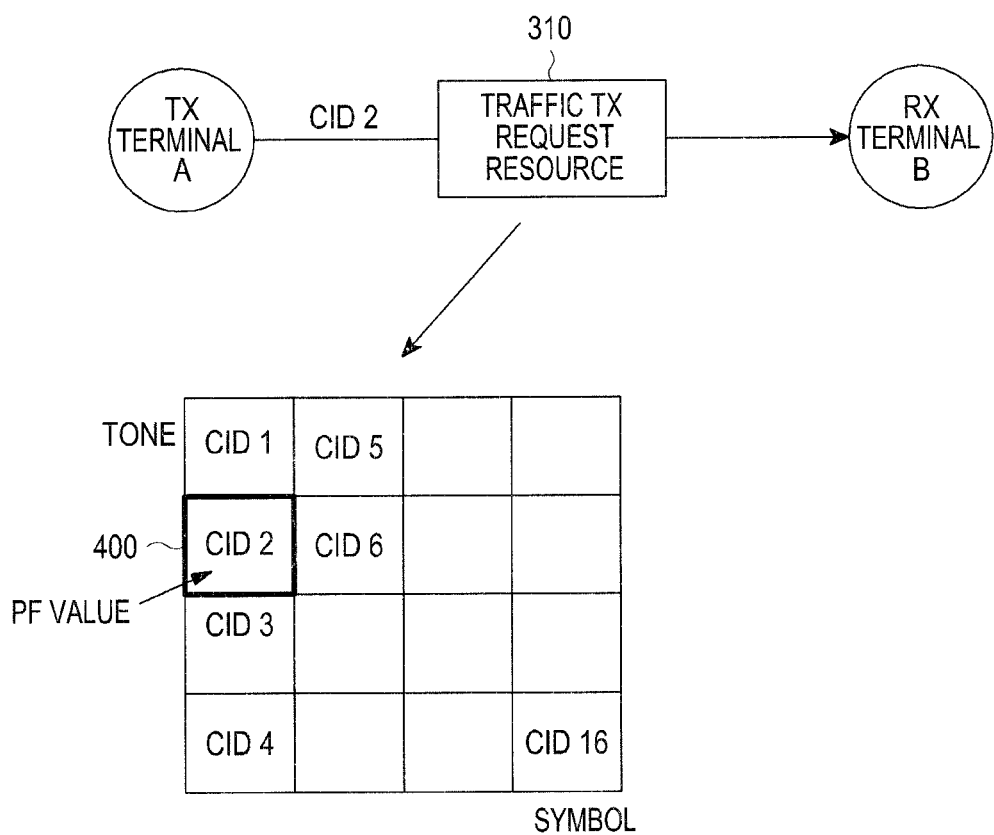
FIG. 4 shows an operation in which a transmitting terminal requests a receiving terminal to transmit data using a traffic transmission request resource region 310 according to an exemplary embodiment of the present invention.

FIG. 4 shows an operation in which a transmitting terminal requests a receiving terminal to transmit data using a traffic transmission request resource region 310 according to an exemplary embodiment of the present invention.

Referring to FIG. 4, when a connection set up between a transmitting terminal and a receiving terminal has a CID2, the transmitting terminal calculates a PF value for the CID2 if the transmitting terminal has data to transmit. Thereafter, the transmitting terminal requests data transmission by transmitting the calculated PF value to the receiving terminal, using a tone 400 that is mapped to a location of the sub block to which the CID2 is assigned.

The PF value represents a connection priority between terminals, and is determined by Equation (1) below.

$$\text{PF value} = f(x/y) \tag{1}$$

where 'x' is a value determined based on at least one of a data QoS level, a data latency, a data buffer size, and a channel state, and 'y' is a serviced data rate.

The PF value is proportional to values of the parameter 'x' and is inversely proportional to a value of the parameter 'y'. For example, a greater PF value represents a higher priority. For example, the PF value may be determined based on at least one of the data QoS level, the data latency, the data buffer size and the channel state.

Figure 5:
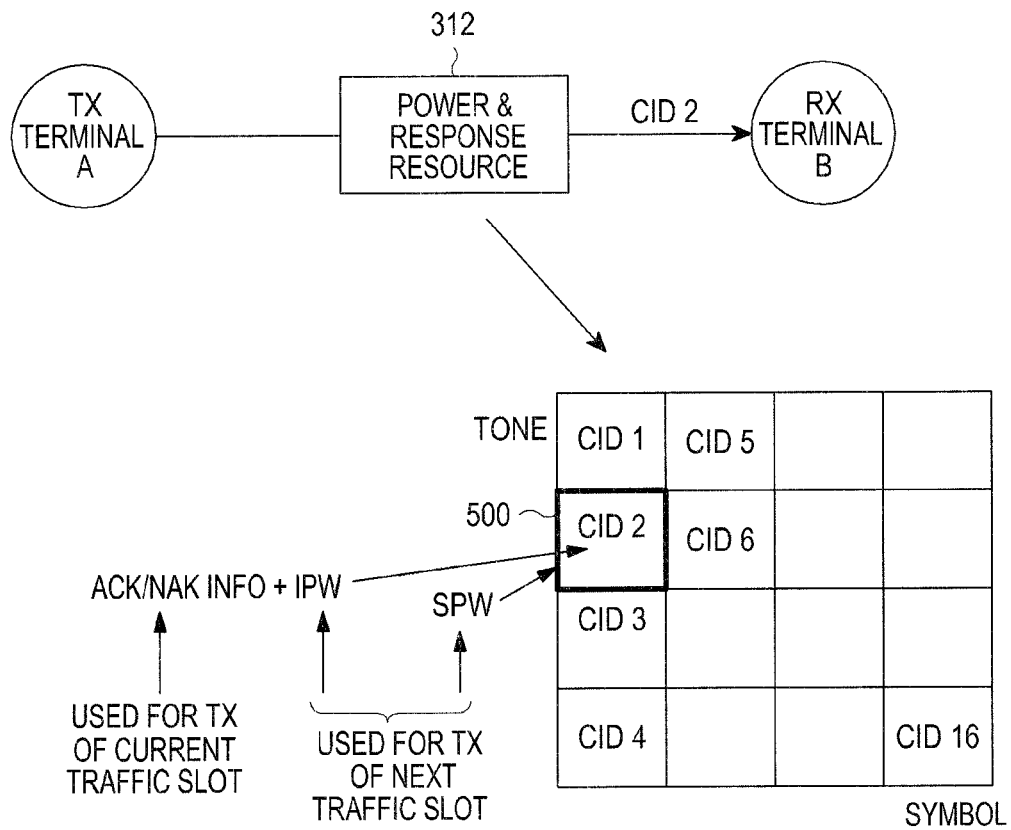
FIG. 5 shows an operation in which a receiving terminal sends a response to a data transmission request to a transmitting terminal using a power & response resource region according to an exemplary embodiment of the present invention.

FIG. 5 shows an operation in which a receiving terminal sends a response to a data transmission request to a transmitting terminal using a power & response resource region according to an exemplary embodiment of the present invention.

Referring to FIG. 5, upon receiving a PF value for CID2 from a transmitting terminal, a receiving terminal compares the PF value for CID2 with a PF value for at least one related CID among the remaining CIDs (i.e., CID1, CID3, CID4, CID5, CID6, and CID16). The receiving terminal sends an ACK message for granting communication for CID2 to the transmitting terminal if the PF value for CID2 is the highest value.

The receiving terminal may send an ACK message for granting communication for CID2 to the transmitting terminal, if it is determined that communication is possible for interference of at least one related CID among the remaining CIDs even though the PF value for CID2 does not correspond to the highest value. The receiving terminal may determine whether communication is possible despite interference of at least one CID, based on a spatial reuse factor α, where α denotes a ratio of Signal Power (SPW) to Interference Power (IPW). For the spatial reuse factor α, α value determined as an average frequency reuse factor, for example, 0.5 may be fixedly used. The spatial reuse factor α may also be calculated as a ratio of a spatial reuse factor estimated in a previous traffic slot to power in a pilot that is actually used in the current traffic slot.

If the PF value for CID2 does not correspond to the highest value and communication is impossible due to interference of at least one related CID among the remaining CIDs, the receiving terminal sends a Non-Acknowledgment (NAK) message for rejecting communication for CID2 to the transmitting terminal.

In response to the data transmission request from the transmitting terminal, the receiving terminal transmits information about the ACK/NAK message, Interference Power (IPW)×α and Signal Power (SPW) to the transmitting terminal using a tone 500 that is mapped to a location of a sub block to which CID2 is assigned. IPW denotes a sum of power serving as interference to CID2, i.e., received power for a signal received using at least one related CID among the remaining CIDs except for CID2, and SPW denotes a power level that is calculated based on received power for a signal received using CID2. The information about the ACK/NAK message denotes information used for transmission of the current traffic slot, and IPW and SPW denote values used to calculate a PF value of the next traffic slot.

Upon receiving the information about the ACK/NAK message, IPW×α, and SPW from the receiving terminal, the transmitting terminal determines whether to transmit data, based on the information about the ACK/NAK message. The transmitting terminal transmits data upon receiving an ACK message, and updates channel state information for the current channel using IPW and SPW upon receiving a NAK message.

Figure 6:
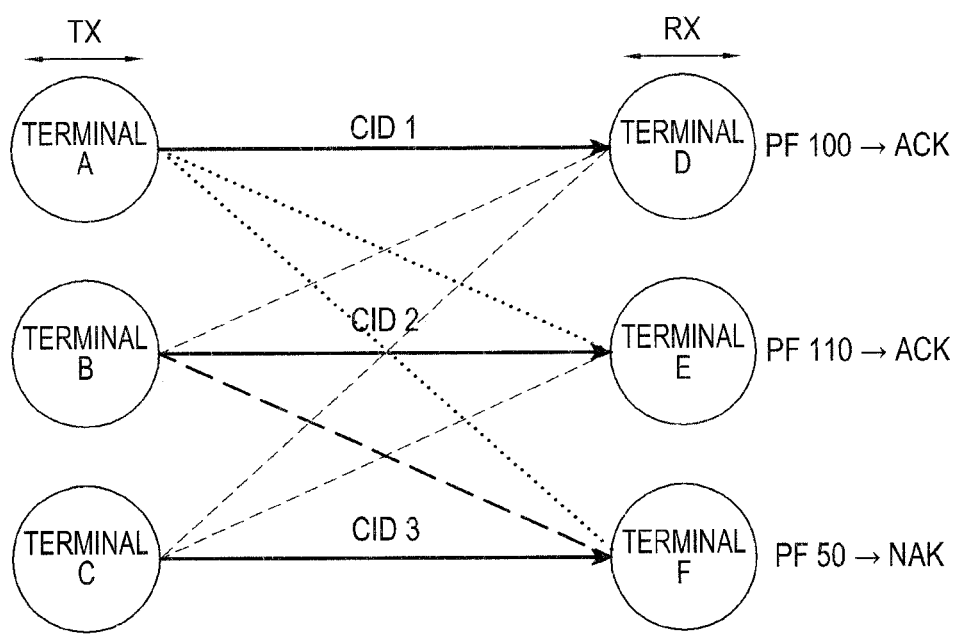
FIG. 6 shows an operation in which receiving terminals send an ACK/NAK message according to an exemplary embodiment of the present invention.

FIG. 6 shows an operation in which receiving terminals send an ACK/NAK message according to an exemplary embodiment of the present invention.

Referring to FIG. 6, terminals A, B, and C included in a transmitting side are transmitting terminals, while a terminals D, E, and F included in a receiving side are receiving terminals. In FIG. 6, a connection between the terminal A and the terminal D has CID1, a connection between the terminal B and the terminal E has CID2, a connection between the terminal C and the terminal F has CID3, a PF value that the terminal D has received from the terminal A is '100', a PF value that the terminal E has received from the terminal B is '110', and a PF value that the terminal F has received from the terminal C is '50'.

A receiving terminal may determine whether communication of a related CID is possible, based on the PF value received from a transmitting terminal and a that it calculated. The receiving terminal may inform the transmitting terminal of the determination results using an ACK/NAK message.

The terminal D compares the PF value '100' for CID1 with PF values '110' and '50' for CID2 and CID3, and sends an ACK message to the transmitting terminal if communication of CID1 is possible for interferences of CID2 and CID3 even though the PF value '100' is not the highest value. The terminal E compares the PF value '110' for CID2 with PF values '100' and '50' for CID1 and CID3, and sends an ACK message to the transmitting terminal because the PF value '110' is the highest value. The terminal F compares the PF value '50' for CID3 with the PF values '100' and '110' for CID1 and CID2, and sends a NAK message to the transmitting terminal, determining that the PF value '50' is not the highest value and communication of CID3 is also impossible due to the interference of CID1 and CID2.

Figure 7:
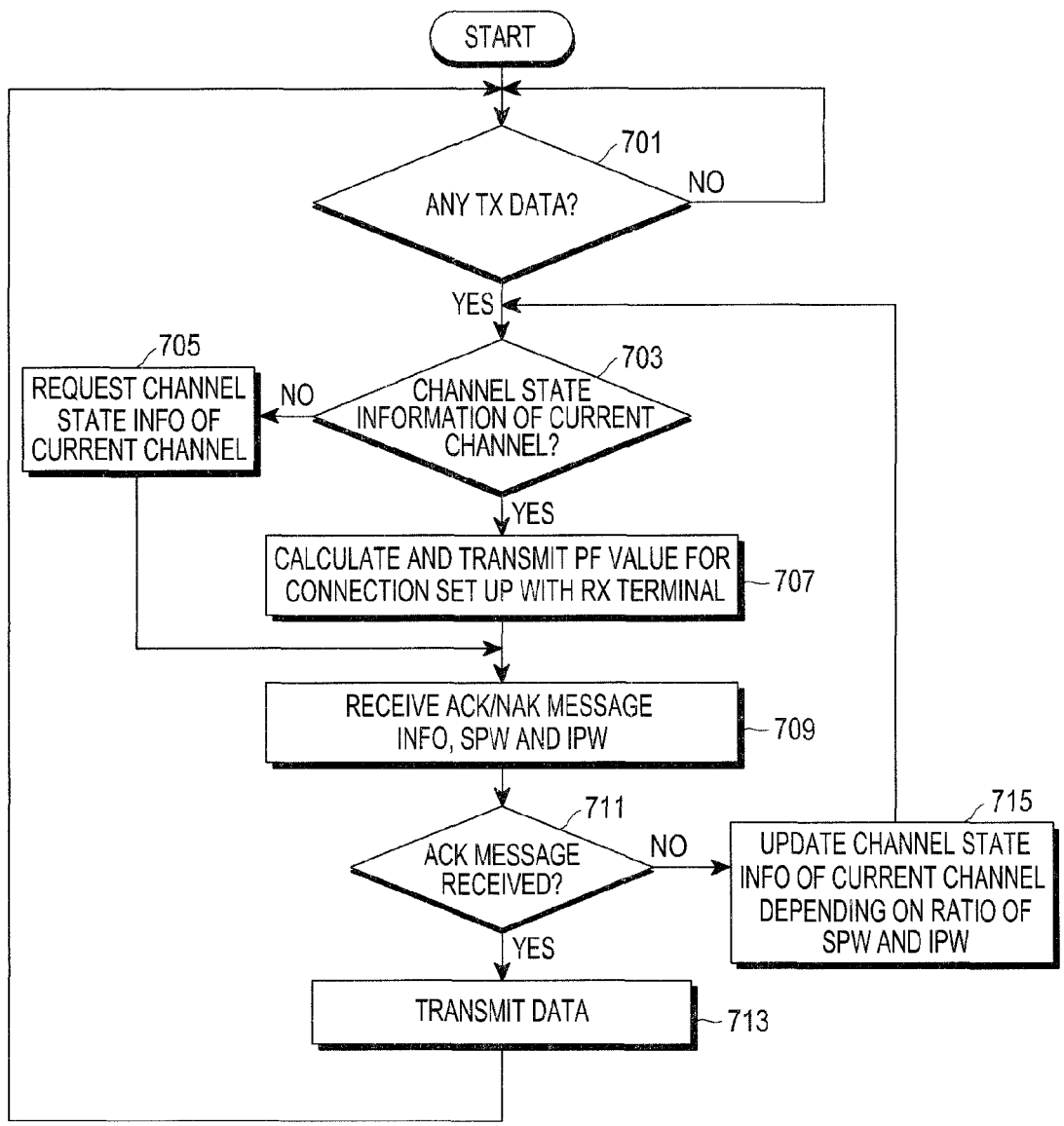
FIG. 7 shows an operation of transmitting data by a transmitting terminal according to an exemplary embodiment of the present invention.

FIG. 7 shows an operation of transmitting data by a transmitting terminal according to an exemplary embodiment of the present invention.

Referring to FIG. 7, the transmitting terminal determines in step 701 whether there is data to transmit. If there is data to transmit, the transmitting terminal proceeds to step 703. Otherwise, if there is no data to transmit, the transmitting terminal continues to determine in step 701 whether there is data to transmit.

In step 703, the transmitting terminal determines whether it has channel state information of the current channel. The term 'channel state information' as used herein may refer to uplink information that is periodically provided without a separate request process. If the transmitting terminal has the current channel state information, the transmitting terminal calculates a PF value for a connection set up to a receiving terminal in step 707. Thereafter, the transmitting terminal requests data transmission by transmitting the PF value to the receiving terminal. The PF value may be transmitted using a resource block to which CID for the setup connection is assigned.

However, if the transmitting terminal does not have the current channel state information, the transmitting terminal requests channel state information of the current channel from the receiving terminal in step 705. The request for channel state information may be sent using a resource block to which CID for the setup connection is assigned.

In step 709, the transmitting terminal receives information about an ACK/NAK message, SPW and IPW from the receiving terminal. In step 711, the transmitting terminal analyzes the received information about an ACK/NAK message to determine whether an ACK message is received. If an ACK message is received, the transmitting terminal transmits data in step 713. If a NAK message rather than the ACK message is received, the transmitting terminal proceeds to step 715.

In step 715, the transmitting terminal estimates channel state information of the current channel depending on a ratio (i.e., α) of SPW to IPW, which are received in step 709, and updates the channel state information which is considered in step 703, using the estimated channel state information. The estimated channel state information may be calculated by Equation (2) below.

$$\text{Estimated Channel State} = (SPW - IPW) \times (1-\alpha) + IPW \quad (2)$$

Figure 8:
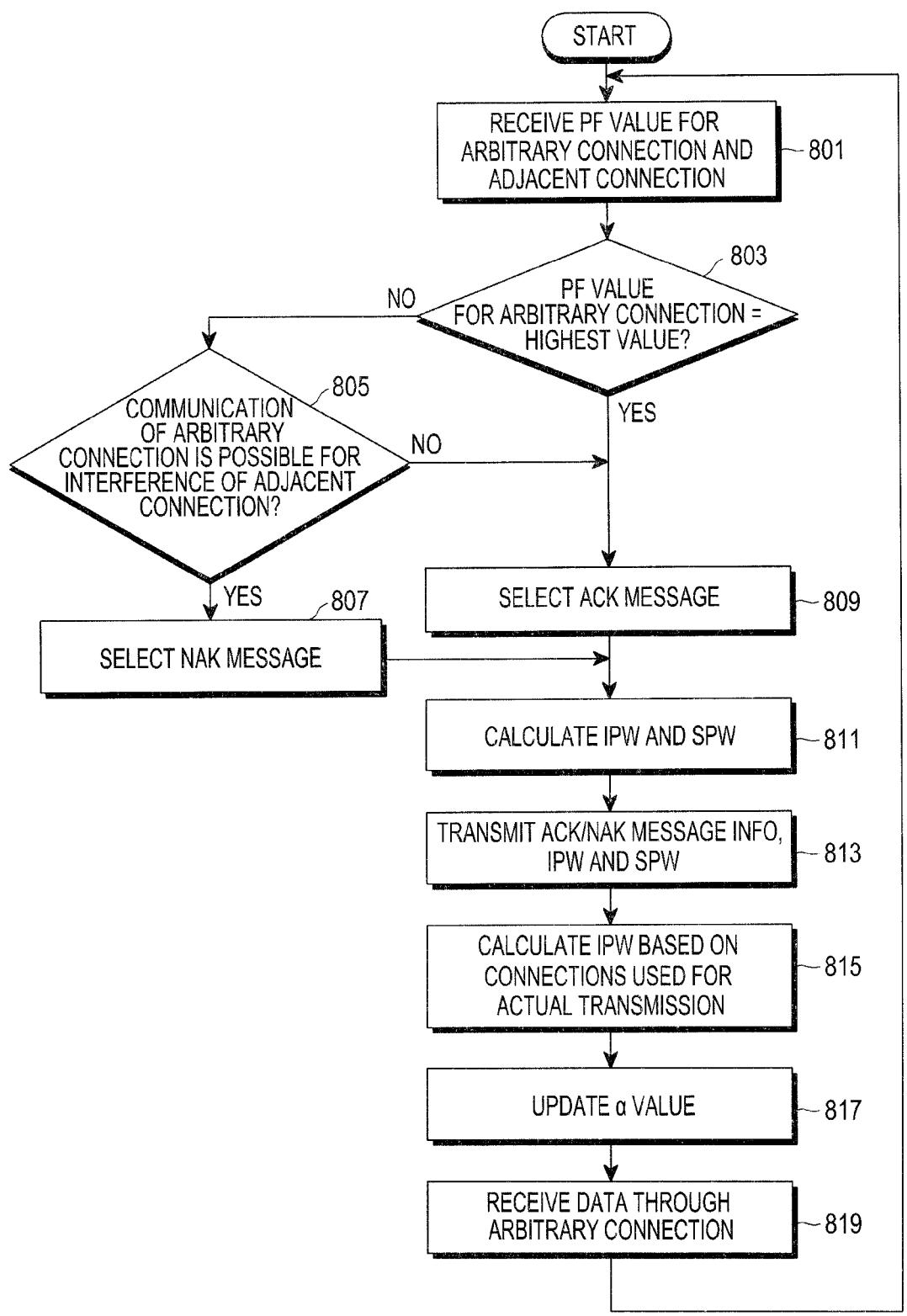
FIG. 8 shows an operation of receiving data by a receiving terminal according to an exemplary embodiment of the present invention.

FIG. 8 shows an operation of receiving data by a receiving terminal according to an exemplary embodiment of the present invention.

Referring to FIG. 8, the receiving terminal receives a PF value for one connection set up to a transmitting terminal and a PF value for at least one adjacent connection in step 801. In step 803, the receiving terminal compares the PF value for a connection with all of the received PF values to determine whether the PF value corresponds to the highest value. If the PF value for a connection corresponds to the highest value, the receiving terminal selects an ACK message for granting communication for the connection in step 809.

However, if the PF value for a connection does not correspond to the highest value, the receiving terminal determines in step 805 whether communication of an arbitrary connection is possible despite interference of an adjacent connection(s). If the communication of an arbitrary connection is possible despite interference of an adjacent connection, the receiving terminal selects an ACK message in step 809. However, if the communication of an arbitrary connection is impossible due to interference of an adjacent connection, the receiving terminal selects a NAK message for rejecting the communication for a connection in step 807.

In step 811, the receiving terminal calculates IPW and SPW. In step 813, the receiving terminal transmits the calculated IPW and SPW to the transmitting terminal together with information about the ACK/NAK messages selected in steps 807 and 809. The information about the ACK/NAK messages, the IPW and the SPW may be transmitted using a resource block to which CID for the arbitrary connection is assigned.

In step 815, the receiving terminal calculates IPW for connections which are used for actual transmission. In step 817, the receiving terminal updates a value of a based on the calculated IPW. In step 819, the receiving terminal receives the data that is transmitted from the transmitting terminal through the arbitrary connection.

Figure 9:
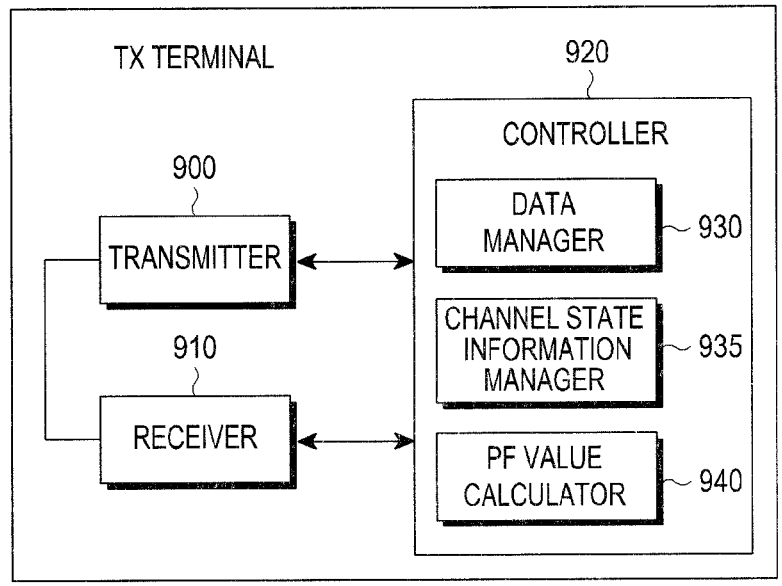
FIG. 9 shows a structure of a transmitting terminal according to an exemplary embodiment of the present invention.

FIG. 9 shows a structure of a transmitting terminal according to an exemplary embodiment of the present invention.

Referring to FIG. 9, the transmitting terminal includes a transmitter 900, a receiver 910, and a controller 920. The controller 920 includes a data manager 930, a channel state information manager 935, and a PF value calculator 940. The transmitting terminal may also include additional units not shown here for convenience of description.

The data manager 930 determines whether there is data that the transmitting terminal will transmit. If there is data to transmit, the channel state information manager 935 determines whether the transmitting terminal has channel state information of the current channel. If the channel state information manager 935 determines that the transmitting terminal has the current channel state information, the PF value calculator 940 calculates a PF value for a connection set up to a receiving terminal, and the transmitter 900 requests data transmission by transmitting the PF value calculated by the PF value calculator 940.

However, if the channel state information manager 935 determines that the transmitting terminal does not have the current channel state information, the transmitter 900 requests the current channel state information from the receiving terminal.

The receiver 910 receives information about an ACK/NAK message, SPW and IPW, and the data manager 930 checks the received information about an ACK/NAK message to determine whether an ACK message is received. If the data manager 930 determines that an ACK message is received, the transmitter 900 transmits data. However, if the data manager 930 determines that a NCK message is received, the receiver 910 updates the channel state information of the current channel by means of the channel state information manager 935, depending on a ratio of the received SPW to IPW.

Figure 10:
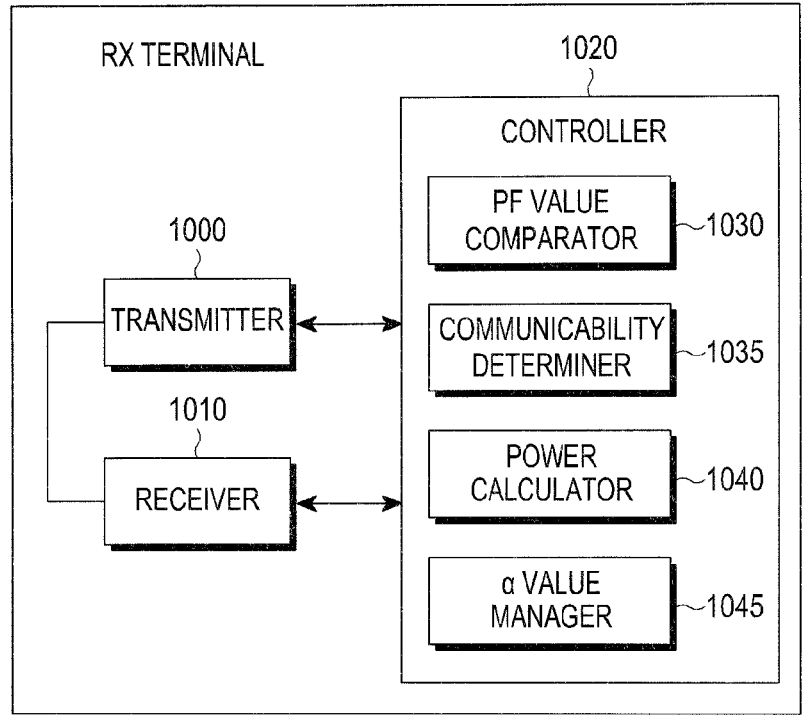
FIG. 10 shows a structure of a receiving terminal according to an exemplary embodiment of the present invention.

FIG. 10 shows a structure of a receiving terminal according to an exemplary embodiment of the present invention.

Referring to FIG. 10, the receiving terminal includes a transmitter 1000, a receiver 1010, and a controller 1020. The controller 1020 includes a PF value comparator 1030, a communicability determiner 1035, a power calculator 1040, and an α value manager 1045. The receiving terminal may also include additional units not shown here for convenience of description.

The receiver 1010 receives a PF value for an arbitrary connection set up to a transmitting terminal, and a PF value for at least one adjacent connection. The PF value comparator 1030 compares the PF value for the arbitrary connection with all of received PF values. If the PF value comparator 1030 determines that the PF value for the arbitrary connection corresponds to the highest value, the communicability determiner 1035 selects an ACK message for granting communication for the arbitrary connection.

However, if the PF value comparator 1030 determines that the PF value for the arbitrary connection does not correspond to the highest value, the communicability determiner 1035 selects a NAK message for rejecting communication for the arbitrary connection.

The power calculator 1040 calculates IPW and SPW, and the transmitter 1000 transmits the calculated IPW and SPW to the transmitting terminal, together with information about the ACK/NAK message. The power calculator 1040 calculates IPW for connections which are used for actual transmission, and the α value manager 1045 updates a value of α based on the calculated IPW. The receiver 1010 receives data through the arbitrary connection.

As is apparent from the foregoing description, if there is a plurality of connections for terminals that can attempt direct communication between terminals in an NFC system, a scheme proposed by exemplary embodiments of the present invention may transmit and receive data depending on a connection priority for each of the plurality of connections, thereby improving spectral efficiency, contributing to an increase in the entire system throughput and to the improvement of fairness.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting and receiving data according to a connection priority between terminals in a Near Field Communication (NFC) system, the method comprising:
    if there is data to transmit, determining a Proportional Fair (PF) value used to determine a connection priority of a first connection set up for direct communication between a first terminal and a second terminal;
    requesting data transmission through the first connection by transmitting the PF value to the second terminal; and
    transmitting the data to the second terminal, if information for granting data transmission through the first connection is received from the second terminal.

2. The method of claim 1, wherein the PF value is determined based on at least one of a data Quality of Service (QoS) level, a data latency, a data buffer size, channel state information, and a serviced data rate.

3. The method of claim 2, wherein the PF value is determined to be proportional to the data QoS level, the data latency, the data buffer size, and the channel state information, and is determined to be inversely proportional to the serviced data rate.

4. The method of claim 1, wherein the PF value is a value calculated when the first terminal has channel state information of a current channel,
    wherein the channel state information is updated according to a ratio of interference power to a received power level, and
    wherein the interference power serves as interference with the first connection and the received power level is calculated based on received power of a signal received through the first connection.

5. The method of claim 4, wherein information about the interference power and the received power level is received from the second terminal together with the information for granting data transmission through the first connection.

6. The method of claim 4, wherein information about the interference power and the received power level is used to calculate a PF value of a next traffic slot.

7. A method for transmitting and receiving data according to a connection priority between terminals in a Near Field Communication (NFC) system, the method comprising:
    receiving a first Proportional Fair (PF) value for a first connection set up for direct communication between a first terminal and a second terminal, and a second PF value for at least one second connection existing between the first terminal and the second terminal;
    comparing the first PF value with the second PF value;
    transmitting information for granting communication through the first connection to the second terminal, if the first PF value corresponds to a highest value; and
    receiving data from the second terminal through the first connection.

8. The method of claim 7, further comprising:
    determining whether communication of the first connection is possible despite interference of the second connection, if the first PF value does not correspond to the highest value; and
    transmitting information for granting communication through the first connection to the second terminal, if communication of the first connection is possible despite interference of the second connection.

9. The method of claim 8, wherein the information for granting communication through the first connection is transmitted to the second terminal together with interference power serving as interference to the first connection and a received power level that is calculated based on received power for a signal received through the first connection.

10. The method of claim 8, further comprising transmitting information for rejecting communication through the first connection to the second terminal, if communication of the first connection is impossible due to the interference of the second connection.

11. The method of claim 10, wherein the information for rejecting communication through the first connection is transmitted to the second terminal together with interference power serving as interference to the first connection and a received power level that is calculated based on received power for a signal received through the first connection.

12. The method of claim 7, wherein the information for granting communication through the first connection is transmitted to the second terminal together with interference power serving as interference to the first connection and a received power level that is calculated based on received power for a signal received through the first connection.

13. An apparatus for transmitting and receiving data according to a connection priority between terminals in a Near Field Communication (NFC) system, the apparatus comprising:
   a controller for determining a Proportional Fair (PF) value used to determine a connection priority of a first connection set up for direct communication between a first terminal and a second terminal, if there is data to transmit;
   a receiver for receiving information for granting communication for the first connection from the second terminal; and
   a transmitter for requesting data transmission through the first connection by transmitting the PF value to the second terminal, and for transmitting the data to the second terminal when the receiver receives the information for granting communication for the first connection from the second terminal.

14. The apparatus of claim 13, wherein the PF value is determined based on at least one of a data Quality of Service (QoS) level, a data latency, a data buffer size, channel state information, and a serviced data rate.

15. The apparatus of claim 14, wherein the PF value is determined to be proportional to the data QoS level, the data latency, the data buffer size and the channel state information, and be inversely proportional to the serviced data rate.

16. The apparatus of claim 13, wherein the PF value is a value calculated when the first terminal has channel state information of a current channel, and the channel state information is updated according to a ratio of interference power a received power level, and
   wherein the interference power serves as interference to the first connection and the received power level is calculated based on received power of a signal received through the first connection.

17. The apparatus of claim 16, wherein information about the interference power and the received power level is received from the second terminal together with the information for granting data transmission through the first connection.

18. The apparatus of claim 16, wherein information about the interference power and the received power level is used to calculate a PF value of a next traffic slot.

19. An apparatus for transmitting and receiving data according to a connection priority between terminals in a Near Field Communication (NFC) system, the apparatus comprising:
   a receiver for receiving a first Proportional Fair (PF) value for a first connection set up for direct communication between a first terminal and a second terminal and a second PF value for at least one second connection existing between the first terminal and the second terminal, and for receiving data from the second terminal through the first connection when information for granting communication for the first connection is transmitted to the second terminal;
   a controller for comparing the first PF value with the second PF value, and for selecting information for granting communication through the first connection if the first PF value corresponds to a highest value; and
   a transmitter for transmitting the information for granting communication for the first connection to the second terminal.

20. The apparatus of claim 19, wherein the controller determines whether communication of the first connection is possible despite interference of the second connection if the first PF value does not correspond to the highest value, and controls the transmitter to transmit the information for granting communication through the first connection to the second terminal if communication of the first connection is possible despite interference of the second connection.

21. The apparatus of claim 20, wherein the controller controls the transmitter to transmit information for rejecting communication through the first connection to the second terminal if communication of the first connection is impossible for the interference of the second connection.

22. The apparatus of claim 21, wherein the information for rejecting communication through the first connection is transmitted to the second terminal together with interference power serving as interference to the first connection and a received power level that is calculated based on received power for a signal received through the first connection.

23. The apparatus of claim 20, wherein the information for granting communication through the first connection is transmitted to the second terminal together with interference power serving as interference to the first connection and a received power level that is calculated based on received power for a signal received through the first connection.

24. The apparatus of claim 19, wherein the information for granting communication through the first connection is transmitted to the second terminal together with interference power serving as interference to the first connection and a received power level that is calculated based on received power for a signal received through the first connection.

* * * * *